Patented Sept. 16, 1930

1,776,203

UNITED STATES PATENT OFFICE

NORMAN STRAFFORD AND ERIC EVERARD WALKER, OF BLACKLEY, MANCHESTER, ENGLAND, ASSIGNORS TO BRITISH DYESTUFFS CORPORATION LIMITED, OF MANCHESTER, ENGLAND

MANUFACTURE OF PHENOLIC RESINS

No Drawing. Application filed June 30, 1928, Serial No. 289,611, and in Great Britain July 7, 1927.

This invention relates to the purification of resinous phenol condensation products, by the removal of free phenol and incompletely polymerized phenolic bodies.

The resin or resinous condensation product is ground and mixed with a solvent, which, although dissolving free phenol, is substantially without action on the more highly polymerized condensation products. The resin may be ground and then extracted with the solvent. It is, however, essential that the resin should retain its finely divided state during the process of extraction.

We have found that it is particularly advantageous to incorporate the resin with an inert filler before carrying out the process of extraction. By this means the finely divided state of the resin is much more readily maintained and thus facilitates the extraction. After extraction which may be carried out in a continuous manner or repeated as many times as is necessary to obtain the desired result the resin may be extracted from the filler by means of a suitable solvent such as acetone or ethyl alcohol, or the resin and filler may be dried together and used as a moulding powder.

Suitable solvents for removing the free phenol and condensation products of low molecular weight are water, benzene and ether, and almost any inert filler may be used such as wood pulp, cotton and other textile wastes, asbestos and other fibrous or cellular materials, and mineral fillers such as china clay, fuller's earth, etc.

Instead of being incorporated with a filler the resin may be spread on paper or fabric and after extraction of the phenolic impurities the sheets may be dried and pressed in known manner to form laminated products.

It is known already that the rate of hardening, stability, colour, colour fastness and other properties of phenol formaldehyde resoles are influenced to a great extent by the hydrogen ion concentration (see British Patent No. 259,046 to Walker, dated 9th April 1925). By the term "resole" is meant the product obtained by the concentration of phenols with formaldehyde in the presence of alkalies, the said product being an intermediate condensation product which is fusible and which is capable under suitable conditions of being converted into an insoluble and infusible resin. The method of adjusting this hydrogen concentration which has been disclosed involves the intimate mixing of the liquid resoles with an aqueous layer whereby equilibrium between the two layers is established. This method of working imposes an upper limit on the viscosity of the liquid resole at the time the adjustment is made, for, if this is too high, intimate mixing cannot be accomplished or, if it is accomplished, the thick emulsion which is formed does not separate again into two layers. This is a great disadvantage.

We have now found that by mixing this liquid resole with a finely divided inert material such as fuller's earth or china clay so that the resole is deposited on or incorporated with the inert material, and then suspending the mixture thus obtained in water in a fine state of division (it may even be ground with water) the hydrogen ion concentration may be adjusted easily and rapidly by the addition of soluble acids or bases (or substances possessing an acidic or alkaline reaction) both in the presence or absence of substances possessing a buffer action. The adjustment of the hydrogen ion concentration may be carried out before, during or after the washing out of the free phenol, but we prefer to carry out the adjustment before purification because as the soluble materials are removed from the resin equilibrium between the aqueous medium and the resin takes place with increasing difficulty. Moreover, it is desirable (though not absolutely necessary) to carry out the washing process with the pH lying between 3.5 and 7. If the pH is lower than 3.5 the resole is apt to be unstable, if it is higher than 7 the yield of purified material is apt to be low. Nevertheless, for some purposes it is desirable also to readjust the pH after the washing is complete. For instance, a sensitive moulding powder may be obtained which hardens very rapidly under the influence of heat by adjusting the pH to about 3.2 after the washing process is complete and then drying at a low temperature with great care. After washing the resin may be dissolved off the substratum, and the solution may be used as a lacquer or evaporated to dryness. Alternatively, the powder may be separated from the water, dried and used as a moulding powder. Bodies modifying the physical condition for instance, hardness, softness or color of the resin, may be mixed with it before use if desired. To this end catalysts (acidic or basic), plasticizers or pigments which are substantially insoluble in the solvent used for extraction may be added. These bodies have different specific effects but they all have a modifying action and hence are herein designated by the general term "modifying bodies."

Instead of using a powdered substratum the resole may be spread in thin layers on sheets of paper, fabric or the like, or the sheets may be impregnated with the resin. The sheets may then be suspended in water for the adjustment of the pH and the removal of free phenols.

Our invention is illustrated, but not limited, by the following example.

*Example.*—Sheets of paper are impregnated with an alcoholic solution of resole and then allowed to dry. The sheets are then washed in several changes of water at 40°–50° C. The phenol content of the resole is reduced to 3 per cent or less, the exact degree of purification depending on the degree of washing, the thickness of the impregnated sheets, and the resin content. The colouring matter, plasticizers, hardening catalysts, etc. may be added to the resin before impregnation provided these are such as not to be dissolved out during washing.

What we claim and desire to secure by Letters Patent is:—

1. Process for the manufacture of purified resinous condensation products of the phenol-aldehyde type for use in the production of laminated products, which consists in impregnating a solid substratum in sheet form with the unhardened water-insoluble resole and then removing phenols and soluble condensation products by extracting the impregnated sheet with a solvent.

2. Process for the manufacture of purified resinous condensation products of the phenol-aldehyde type for use in the production of laminated products, which consists in impregnating a solid substratum in sheet form with the unhardened water-insoluble resole and then removing phenols and soluble condensation products by extracting the impregnated sheet with water.

3. Process for the manufacture of purified resinous condensation products of the phenol-aldehyde type for use in the production of laminated products, which consists in impregnating a solid substratum in sheet form with the unhardened water-insoluble resole and then removing phenols and soluble condensation products by extracting the impregnated sheet with water, the hydrogen ion concentration of the water in equilibrium with the resole having been adjusted to a pH value between 3.5 and 7.0.

4. Process for the manufacture of purified resinous condensation products of the phenol-aldehyde type for use in the production of laminated products, which consists in impregnating a solid substratum in sheet form with the unhardened water-insoluble resole and then removing phenols and soluble condensation products by extracting the impregnated sheet with water, the hydrogen ion concentration of the water in equilibrium with the resole having been adjusted to a pH value of 6.0.

5. The process of claim 1 in which the substratum is paper.

6. The process of claim 1 in which the resole contains a hardening catalyst which is substantially insoluble in the solvent used for extraction.

7. The process of claim 1 in which the resole contains an acid catalyst which is substantially insoluble in the solvent used for extraction.

8. In the manufacture of purified resinous condensation products of the phenol-aldehyde type, the process which comprises impregnating a solid substratum in sheet form with an unhardened water-insoluble resole, extracting the impregnated sheet with a solvent to remove phenols and soluble condensation products and then dissolving the said resole from the said substream by means of a different solvent.

9. The process of claim 8 in which the solvent used to dissolve the resole from the substratum is alcohol.

In testimony whereof we affix our signatures.

NORMAN STRAFFORD.
ERIC EVERARD WALKER.